United States Patent
Zhao et al.

(10) Patent No.: US 9,870,288 B2
(45) Date of Patent: Jan. 16, 2018

(54) CONTAINER-BASED PROCESSING METHOD, APPARATUS, AND SYSTEM

(71) Applicant: Huawei Technologies Co., Ltd., Shenzhen (CN)

(72) Inventors: Qi Zhao, Hangzhou (CN); Zhenzhang Yang, Hangzhou (CN)

(73) Assignee: Huawei Technolgoies Co., Ltd., Shenzhen (CN)

( * ) Notice: Subject to any disclaimer, the term of this patent is extended or adjusted under 35 U.S.C. 154(b) by 52 days.

(21) Appl. No.: 14/542,009

(22) Filed: Nov. 14, 2014

(65) Prior Publication Data

US 2015/0074058 A1    Mar. 12, 2015

Related U.S. Application Data

(63) Continuation of application No. PCT/CN2012/081583, filed on Sep. 19, 2012.

(30) Foreign Application Priority Data

May 14, 2012   (CN) .......................... 2012 1 0148519

(51) Int. Cl.
    *G06F 11/14*   (2006.01)
    *G06F 17/30*   (2006.01)
    *G06F 9/455*   (2006.01)

(52) U.S. Cl.
    CPC ...... *G06F 11/1446* (2013.01); *G06F 9/45558* (2013.01); *G06F 11/1438* (2013.01);
    (Continued)

(58) Field of Classification Search
    CPC ........... G06F 11/1446; G06F 17/30073; G06F 11/1438; G06F 11/1458; G06F 11/1451;
    (Continued)

(56) References Cited

U.S. PATENT DOCUMENTS 5,440,739 A * 8/1995 Beck et al. ................... 709/221
5,586,322 A * 12/1996 Beck et al.
(Continued)

FOREIGN PATENT DOCUMENTS

CN    101046803 A    10/2007
CN    101251814 A    8/2008
(Continued)

OTHER PUBLICATIONS

Yang et al., WO/2012/103827, abstract (machine translation), published Aug. 9, 2012.*
(Continued)

*Primary Examiner* — James Trujillo
*Assistant Examiner* — Hubert Cheung
(74) *Attorney, Agent, or Firm* — Leydig, Voit & Mayer, Ltd.

(57) ABSTRACT

A container-based processing method includes: when a container state needs to be backed up, determining that content of a first control group file in at least one control group file of the container is modified; acquiring, a file name of the first control group file corresponding to the first flag bit; searching for, according to a correspondence between the file name of the at least one control group file and a storage location of the at least one control group file, a storage location of the first control group file corresponding to the file name of the first control group file, and extracting modified content of the first control group file from the first control group file stored in the storage location of the first control group file; and backing up the file name of the first control group file and the modified content of the first control group file.

23 Claims, 8 Drawing Sheets

(52) U.S. Cl.
CPC ...... *G06F 11/1451* (2013.01); *G06F 11/1458* (2013.01); *G06F 17/30073* (2013.01); *G06F 11/1484* (2013.01); *G06F 2009/45575* (2013.01); *G06F 2201/815* (2013.01)

(58) Field of Classification Search
CPC ............ G06F 11/1484; G06F 9/45558; G06F 2009/45575; G06F 2201/815
See application file for complete search history.

(56) References Cited

U.S. PATENT DOCUMENTS

| | | | |
|---|---|---|---|
| 5,613,109 A * | 3/1997 | Yamauchi et al. | |
| 5,831,617 A * | 11/1998 | Bhukhanwala | 715/839 |
| 6,205,543 B1 * | 3/2001 | Tremblay et al. | 712/228 |
| 6,460,054 B1 | 10/2002 | Grummon | |
| 8,266,109 B1 * | 9/2012 | Bilsborough | 707/661 |
| 8,321,867 B1 * | 11/2012 | Holl et al. | 718/102 |
| 2002/0026558 A1 * | 2/2002 | Reuter | G06F 3/0605 711/114 |
| 2003/0217077 A1 * | 11/2003 | Schwartz et al. | 707/200 |
| 2003/0220948 A1 * | 11/2003 | Green et al. | 707/204 |
| 2009/0313503 A1 * | 12/2009 | Atluri et al. | 714/19 |
| 2010/0094825 A1 * | 4/2010 | Kelso et al. | 707/705 |
| 2011/0208928 A1 | 8/2011 | Chandra et al. | |
| 2012/0084595 A1 | 4/2012 | Dutch et al. | |
| 2012/0210083 A1 * | 8/2012 | Lawrence | 711/162 |
| 2012/0227058 A1 * | 9/2012 | Hunt | G06F 9/45558 719/318 |
| 2012/0290702 A1 * | 11/2012 | Vincent | G06F 9/45558 709/223 |
| 2013/0030827 A1 * | 1/2013 | Snyder et al. | 705/2 |
| 2014/0040548 A1 * | 2/2014 | Hyer et al. | 711/114 |
| 2015/0006487 A1 * | 1/2015 | Yang | G06F 9/461 707/649 |

FOREIGN PATENT DOCUMENTS

| | | |
|---|---|---|
| CN | 102439564 A | 5/2012 |
| EP | 2746936 A1 | 6/2014 |
| WO | WO 2011042306 A1 | 4/2011 |

OTHER PUBLICATIONS

Yang et al., WO/2012/103827 (machine translation), published Aug. 9, 2012.*

* cited by examiner

| | |
|---|---|
| blkio.sectors | devices.allow |
| blkio.time | devices.deny |
| blkio.weight | devices.list |
| cgroup.event_control | freezer.state |
| cgroup.procs | memory.failent |
| cpuacct.stat | memory.force_empty |
| cpuacct.usage | memory.limit_in_bytes |
| cpuacct.usage_percpu | memory.max_usage_in_bytes |
| cpu.rt_period_us | memory.memsw.failent |
| cpu.rt_runtime_us | memory.memsw.limit_in_bytes |
| cpuset.cpu_exclusive | memory.memsw.max_usage_in_bytes |
| cpuset.cpus | memory.memsw.usage_in_bytes |
| cpuset.mem_exclusive | memory.move_charge_at_immigrate |
| cpuset.mem_hardwall | memory.soft_limit_in_bytes |
| cpuset.memory_migrate | memory.stat |
| cpuset.memory_pressure | memory.swappiness |
| cpuset.memory_spread_page | memory.usage_in_bytes |
| cpuset.memory_spread_slab | memory.use_hierarchy |
| cpuset.mems | net_cls.classid |
| cpuset.sched_load_balance | notify_on_release |
| cpuset.sched_relax_domain_level | tasks |
| cpu.shares | cont_flag |

CONTAINER-BASED PROCESSING METHOD, APPARATUS, AND SYSTEM

CROSS-REFERENCE TO RELATED APPLICATIONS

This application is a continuation of International Patent Application No. PCT/CN2012/081583, filed on Sep. 19, 2012, which claims priority to Chinese Patent Application No. 201210148519.5, filed on May 14, 2012, both of which are hereby incorporated by reference in their entireties.

TECHNICAL FIELD

The present invention relates to the computer field, and in particular, to a container-based processing method, apparatus, and system.

BACKGROUND

In a computer system, a container can function as a lightweight virtual machine. That is, the container is a type of virtualization of a resource on an operating system layer and is used to isolate processes and resources. With assistance of the container, the operating system of the computer system can enable an application program to run as if on an independent machine. The operating system effectively partitions the resources managed by a single operating system to an isolated group to better balance conflicted resource use requirements between isolated groups. Common container technologies include Solaris Zones, BSD Jails, and containers in a Linux operating system.

In a Linux kernel, generally, a control group file system may be used to manage the container. The control group is used to perform control on behaviors of a group of processes, thereby limiting system resources used by processes and sub-processes thereof. Accordingly, before the container is used, the control group file system needs to be mounted. For example, a control group directory "/cgroup" is created, and a control group file is generated in the directory to limit the system resources used by the processes.

During a running process of the container, a container state and a process state may need to be backed up/restored (checkpoint/restart, C/R), which requires that a state (for example, a resource limit state of the container) of the control group at a moment be learnt. In a common solution, all control group files in the control group directory are traversed to acquire and save the state of the control group. Generally, tens of control group files are saved in the control group directory "/cgroup". Therefore, system overhead of a traversing mechanism is larger, and the system overhead linearly grows with an increase of the number of files.

SUMMARY

Embodiments of the present invention provide a container-based processing method, apparatus, and system, which are capable of reducing system overhead.

According to one aspect, a container-based processing method is provided, including: when a container state needs to be backed up, determining, according to a first flag bit in a flag file, that content of a first control group file in at least one control group file of the container is modified, where the at least one control group file is used to perform control on running of a group of processes in the container, the flag file includes at least one flag bit corresponding to the at least one control group file, and the at least one flag bit is used to separately indicate whether content of the at least one control group file is modified; acquiring, according to a correspondence between the at least one flag bit and a file name of the at least one control group file, a file name of the first control group file corresponding to the first flag bit; searching for, according to a correspondence between the file name of the at least one control group file and a storage location of the at least one control group file, a storage location of the first control group file corresponding to the file name of the first control group file, and extracting modified content of the first control group file from the first control group file stored in the storage location of the first control group file; and backing up the file name of the first control group file and the modified content of the first control group file.

According to another aspect, a container-based processing apparatus is provided, including: a determining module, configured to: when a container state needs to be backed up, determine, according to a first flag bit in a flag file, that content of a first control group file in at least one control group file of the container is modified, where the at least one control group file is used to perform control on running of a group of processes in the container, the flag file includes at least one flag bit corresponding to the at least one control group file, and the at least one flag bit is used to separately indicate whether content of the at least one control group file is modified; an acquiring module, configured to acquire, according to a correspondence between the at least one flag bit and a file name of the at least one control group file, a file name of the first control group file corresponding to the first flag bit; a searching module, configured to search for, according to a correspondence between the file name of the at least one control group file and a storage location of the at least one control group file, a storage location of the first control group file corresponding to the file name of the first control group, and extract modified content of the first control group file from the first control group file stored in the storage location of the first control group file; and a backup module, configured to back up the file name of the first control group file and the modified content of the first control group file.

According to another aspect, a computer system is provided, including: a bus; a processor connected to the bus, where one or more containers are running on the processor; and a memory connected to the bus; where the processor calls code stored in the memory over the bus to: when a state of a container of the one or more containers need to be backed up, determine, according to a first flag bit in a flag file, that content of a first control group file in at least one control group file of the container is modified, where the at least one control group file is used to perform control on running of a group of processes in the container, the flag file includes at least one flag bit corresponding to the at least one control group file, and the at least one flag bit is used to separately indicate whether content of the at least one control group file is modified; acquire, according to a correspondence between the at least one flag bit and a file name of the at least one control group file, a file name of the first control group file corresponding to the first flag bit; search for, according to a correspondence between the file name of the at least one control group file and a storage location of the at least one control group file, a storage location of the first control group file corresponding to the file name of the first control group file, and extract modified content of the first control group file from the first control group file stored in the storage location of the first control group file; and back up the file name of the first control group file and the modified content of the first control group file.

In the embodiment of the present invention, when the container state needs to be backed up, it is determined that the content of the first control group file in the at least one control group file of the container is modified according to the first flag bit in the flag file, where the at least one control group file is used to perform control on the running of the group of processes in the container, the flag file includes at least one flag bit corresponding to the at least one control group file, and the at least one flag bit is used to separately indicate whether the content of the at least one control group file is modified; the file name of the first control group file corresponding to the first flag bit is acquired according to a correspondence between the at least one flag bit and the file name of the at least one control group file; according to the correspondence between the file name of the at least one control group file and the storage location of the at least one control group file, the storage location of the first control group file corresponding to the file name of the first control group file is searched for, and the modified content of the first control group file is extracted from the first control group file stored in the storage location of the first control group file; and the file name of the first control group file and the modified content of the first control group file are backed up. As seen above, in the embodiment of the present invention, the control group file, of which the content is modified, among a plurality of control group files corresponding to the container may be determined according to the flag bit in the flag file, and therefore the container state may be learnt without traversing all the control group files, and the storage location of the modified control group file may be searched for only according to the flag bit and the modified content of the control group file may be backed up, thereby reducing the system overhead.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a screen capture of a control group file system according to an embodiment of the present invention;

DESCRIPTION OF EMBODIMENTS

Figure 1:
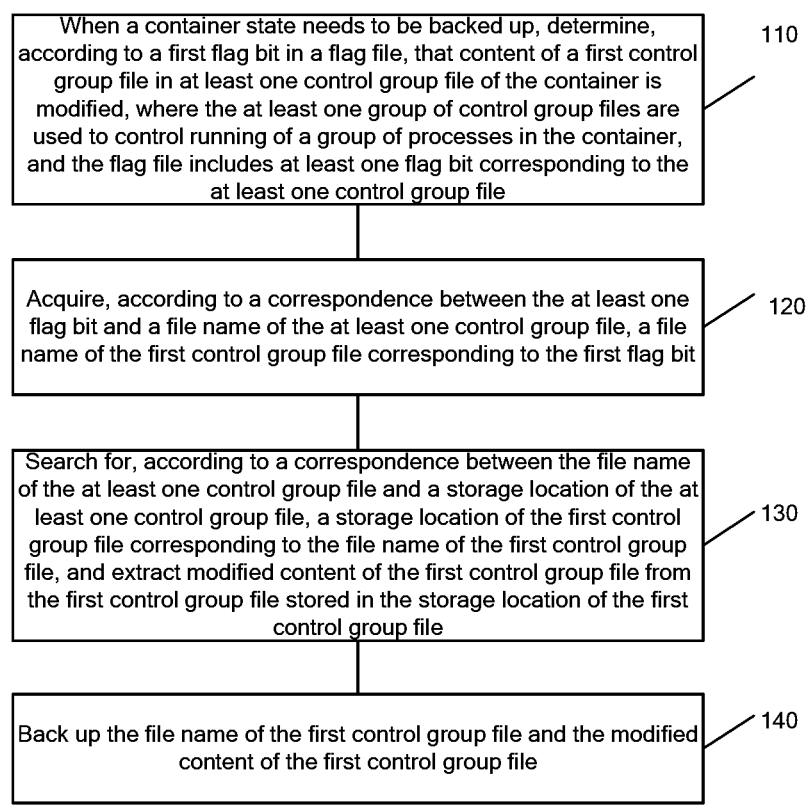
FIG. 1 is a schematic flowchart of a container-based processing method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In a container-based processing system, backup/restoration indicates that a state (for example, a state of a control group) of the container at a moment and an execution state of a process in the control group are saved and restored. After the container state and the execution state of the process are restored, the process can continue an execution from the execution state at a saving moment and maintains various behavior controls at the saving moment. The container state may include a resource limit state of the container, security information of the container, a name of a host where the container is located, and the like.

A premise for implementing real-time saving and restoration of the execution state of an application program is that, the application program is running in a virtual container; that is, independent naming space is used to implement lightweight virtualization. Resource limitation may be implemented by creating a control group for the application program in the container and by using a control group mechanism. When the control group is created for the container, a control group directory corresponding to the container is generated. When the resource limitation is required for the application program in the container, the control group file presenting a specified resource in the control group directory needs to be opened, and a size of the resource that is allowed to be used by process is written into the open control group file, thereby achieving a resource limitation objective. Therefore, a value in each file in the control group directory corresponding to the container indicates a limit value for various resources used for the running of the application program in the container. In addition, when the control group file is created, a value in the control group file is used as a default value.

During a process for backing up/restoring the container state and process state, a resource limit state of the container may be achieved by saving the value in each control group file in the control group directory corresponding to the container.

A conventional solution for backing up/restoring the container state is as follows: in a backup phase, all control group files in the control group directory corresponding to the container are traversed, and the values in all the control group files are recorded and saved in a container state file. After the backup is completed, the container and the control group directory corresponding to the container may be deleted. In a restoration phase, a new container and a control group directory corresponding to the container may be established; the saved container state file is used as an input to read all values saved in the container state file, all the control group files in the new control group directory are traversed again, and the values saved in the container state file are written into these control group files to restore the resource limitation state in the backup phase. Herein new control group file indicates the new control group directory and new control group file created for the new container when the container state is restored, and the new control group file includes a default value.

According to the foregoing method, during container state backup and restoration, tens of control group files in the corresponding control group directory need to be opened twice to perform a read operation and a write operation. However, initial values of these control group files are the same each time these control group files are created, and only a few control group files are relatively changed or completely not changed during creation. Therefore, the conventional solution obviously lowers the backup and restoration efficiency. With the perfection of a control group mechanism, the number of files in the control group directory gradually increases, and the system overhead for the traverse mechanism linearly increases with the increase of the number of files. Therefore, the extensibility is poorer.

Therefore, an objective presented by the present invention is also to further shorten time required for the container state backup and restoration and decrease the system overhead during backup and restoration processes.

FIG. 1 is a schematic flowchart of a container-based processing method according to an embodiment of the present invention. The method in FIG. 1 includes the following steps:

110. When a container state needs to be backed up, determine, according to a first flag bit in a flag file, that content of a first control group file in at least one control group file of the container is modified, where the at least one control group file is used to perform control on running of a group of processes in the container, the flag file includes at least one flag bit corresponding to the at least one control group file, and the at least one flag bit is used to separately indicate whether content of the at least one control group file is modified.

120. Acquire, according to a correspondence between the at least one flag bit and a file name of the at least one control group file, a file name of the first control group file corresponding to the first flag bit.

130. Search for, according to a correspondence between the file name of the at least one control group file and a storage location of the at least one control group file, a storage location of the first control group file corresponding to the file name of the first control group file, and extract modified content of the first control group file from the first control group file stored in the storage location of the first control group file.

140. Back up the file name of the first control group file and the modified content of the first control group file.

For example, the at least one control group file and the flag file may be stored in a directory (hereinafter referred to as a control group directory) of a control group file system corresponding to the container. The at least one control group file may be used to perform behavior control on a group of processes running in the container. The content of the at least one control group file may be a limit value for a system resource that may be used by the processes, for example, CPU time, a memory size, and a bandwidth. For example, the foregoing group of processes has at least one process.

When the content of a control group file among the at least one control group file is modified, a flag bit corresponding to the control group file may be accordingly modified. For example, the corresponding flag bit may be set to record which control group file is modified. In this way, whether the control group file corresponding to the flag bit is modified may be determined by checking whether a value of the flag bit or the flag bit is modified. For example, when the flag bit is 1, it indicates that the control group file corresponding to the flag bit is modified; when the flag bit is 0, it indicates that the control group file corresponding to the flag bit is not modified. Therefore, a state of the control group or the container (for example, a size of the limit value for the system resource) may be rapidly learnt.

In a specific application, modification of the flag bit may be caused by reading a set configuration file to modify the control group file during start up of the container, or may be caused by manually modifying, by a user, the control group file during a running process of the container, which is not limited in the embodiment of the present invention.

When the container state needs to be backed up, the flag bit file may be read, the file name of the first control group file is determined according to the modified first flag bit in the flag file, the first control group file corresponding to the first flag bit is searched for among the at least one control group file according to the file name of the first control group file, and the modified content of the first control group file is backed up in a container state file.

For example, the container state file may be stored in a directory (for example, a directory where a source file of a process is located) of the process and is used to record a modification condition of the control group file. In a phase of backing up the container state, the file may be read from the control group directory, which control group file is modified is learnt from the modified flag bit, and the control group file is searched for in the control group directory according to the file name of the control group file, for example, searching for the storage location of the control group file. The embodiment of the present invention does not limit a method for searching for a control group file, for example, a traversing method, a dichotomy method, or a hash search method may be adopted. After the control group file is found, the control group file may be opened and the content of the control group file (for example, the CPU time and the memory size) is read, and the content is written into the container state file and is used for restoring the container state.

It should be understood that, the correspondence between the at least one flag bit and the file name of the at least one control group file may be acquired and saved when the flag file is established. For example, the correspondence between the at least one flag bit and the file name of the at least one control group file may be acquired by using a function for traversing the control group file in the control group directory, that is, a sequence of the flag bit and a sequence for traversing the control group file are consistent. The embodiment of the present invention is not limited thereto, and the correspondence between the at least one flag bit and the file name of the at least one control group file can also be acquired by using this function when the container state is backed up.

It should also be understood that, the container state may be backed up when required and the container state can also be backed up according to a preset period. The embodiment of the present invention does not limit an occasion for backing up the container state.

According to the embodiment of the present invention, the control group file of which the content is modified may be determined by using the flag bit in the flag file. Therefore, the container state may be learnt without traversing all the control group files, and the storage location of the modified control group file may be searched for only according to the flag bit and the modified content of the control group file may be backed up, thereby reducing the system overhead.

Optionally, as another embodiment, the method further includes: establishing a first hash look-up table for a file path of the at least one control group file, where the first hash look-up table is used to indicate the correspondence between the file name of the at least one control group file and the storage location of the at least one control group file; wherein 130, the storage location of the first control group file corresponding to the file name of the first control group file may be searched for in the first hash look-up table according to the file name of the first control group file; in 140, the file name of the first control group file and the modified content of the first control group file may be backed up in the container state file. In other words, the first hash look-up table may be established for the file path of the at least one control group file, where the first control group file corresponding to the first flag bit may be searched for in the forgoing at least one control group file by using the first hash look-up table and according to the file name of the first control group file.

For example, in the phase for backing up the container state, the control group file needs to be searched for in the control group directory according to the file name of the modified control group file. The hash look-up table may be established for a path of the control group file and the storage location of the control group file may be directly found according to the hash look-up table to accelerate a speed of searching for the control group file, thereby improving the control group file search and access efficiency.

For example, an index value may be calculated according to the file name of the control group file and a hash function used by the first hash look-up table, and the storage location of the control group file is determined by using the index value to look up the first hash look-up table. Because the storage location of the control group file may be directly found by using the calculated index value according to the embodiment of the present invention, traversing all control group files in the control group directory in the phase of backing up the container state to search for the control group file is avoided.

For example, according to the embodiment of the present invention, the at least one flag bit may be checked, and when it is determined that a value of the at least one flag bit is not 0 (it means that the control group file corresponding to the at least one flag bit is modified), the hash look-up table is established for all the file paths in the control group directory corresponding to the container. If all values of the at least one flag bit are 0, it means that no control group file is modified and it is unnecessary to back up the container state. Therefore, it is unnecessary to establish the hash look-up table.

In addition, after the backup is completed, the container and the control group directory corresponding to the container may be deleted.

Optionally, as another embodiment, the method further includes: when the container state needs to be restored, acquiring the file name of the backed up first control group file and the modified content of the first control group file, searching for, according to the correspondence between a file name of at least one to-be-restored control group file and a storage location of the at least one to-be-restored control group file, a storage location of a to-be-restored first control group file corresponding to the file name of the first control group file, and writing the backed up modified content of the first control group file into the to-be-restored first control group file that is stored in the storage location of the to-be-restored first control group file. In other words, when the container state needs to be restored, the container state file may be read so that the file name of the first control group file and the modified content of the first control group file are acquired; at least one new control group file and a new flag file are stored, where the at least one new control group file is used to perform control on the running of a group of processes in the new container; and the new first control group file is searched for from the at least one new control group file according to the file name of the first control group file, and the modified content of the first control group file is written into the new first control group file.

For example, in the phase when the container state needs to be restored, a new control group directory, the new control group file, and the new flag file may be established for the new container. Then, the saved file name and the modified content of the control group file may be read from the container state file, and the new control group file is searched for in the new control group directory according to the file name of the control group file. The embodiment of the present invention does not limit a method for searching for a control group file, for example, a traversing method, a dichotomy method, or a hash search method may be adopted. After the new control group file is found, the new control group file may be opened and the modified content saved in the container state file is written into the new control group file, thereby completing a process of restoring the container state. The new container and the control group directory corresponding to the new container may be created when the container state is recovered.

It should further be understood that, the container state may be restored when required, and the embodiment of the present invention does not limit an occasion for restoring the container state.

Optionally, as another embodiment, the method further includes: establishing a second hash look-up table for the file path of the at least one to-be-restored control group file, where the second hash look-up table is used to indicate the correspondence between the file name of the at least one to-be-restored control group file and the storage location of the to-be-restored (or new) at least one control group file, and the searching for, according to the correspondence between a file name of at least one to-be-restored control group file and a storage location of the at least one to-be-restored control group file, a storage location of a to-be-restored first control group file corresponding to the file name of the first control group file includes: searching for, in the second hash look-up table according to the file name of the first control group file, the storage location of the to-be-restored first control group file corresponding to the file name of the first control group file.

In other words, the second hash look-up table may be established for the file path of the at least one control group file, where the first control group file may be searched for in the forgoing at least one control group file by using the second hash look-up table according to the file name of the first control group file.

For example, an index value may be calculated according to the file name of the control group file and a hash function used by the second hash look-up table, and the storage location of the control group file is determined according to the index value and the second hash look-up table. Because the storage location of the control group file may be directly found by using the calculated index value according to the embodiment of the present invention, traversing all control group files in the control group directory in the phase of restoring the container state to search for the control group file is avoided.

Optionally, as another embodiment, the method shown in FIG. 1 further includes: when the container state needs to be restored, creating a new container; generating a control group directory corresponding to the new container, generating the at least one to-be-restored control group file and a to-be-restored flag file in the control group directory corresponding to the new container; and establishing a one-to-one correspondence between a file name of the at least one to-be-restored control group file and at least one flag bit of the to-be-restored flag file.

For example, the new container needs to be created to back up the container state, and the corresponding control group file and flag file are generated in the control group directory of the new container, where the new control group file and the flag file may include an initial value. In addition, a one-to-one correspondence between the new control group file and the new flag bit may further be established by using an array manner when the control group directory is created.

Optionally, as another embodiment, the method shown in FIG. 1 further includes: when the content of the first control group file in the at least one control group file is modified, modifying the first flag bit that is in the flag file and corresponding to the first control group file; and when at least one flag bit in the flag file is modified, determining that the container state needs to be backed up, or when an instruction for backing up the container state is received or a preset period for backing up the container state expires, detecting whether at least one flag bit in the flag file is modified (if the initial value of the flag bit is 0, that is, detecting whether all the flag bits in the detected flag file are 0), and determining an operation for backing up the container state when it is detected that at least one flag bit in the flag file is modified.

For example, when a control group file is modified, the flag bit corresponding to the control group file is accordingly modified, and an operation for backing up the container state is triggered. Optionally, the container state may not be backed up temporarily when the flag bit is modified, the flag file is read only when the user issues a backup instruction or the preset period expires, and then whether the flag bit in the flag file is modified is determined; only if modified, the operation for backing up the container state is triggered to be implemented. If all the flag bits in the flag file are not modified (it indicates that no modification is made in the control group file), the container state backup and restoration processes are directly skipped, which also reduces unnecessary system overheads.

According to the embodiment of the present invention, the content of the first control group file in the at least one control group file may be modified according to a preset configuration file when the container starts.

Optionally, as another embodiment, the content of the first control group file in the at least one control group file may be modified according to a user requirement in the running process of the container.

According to the embodiment of the present invention, the content of the at least one control group file is a limit value for a resource used by a group of processes in the container during running.

The at least one control group file is used to collectively control the limit value of the resource used by the group of processes. For example, the control group file related to the CPU can limit CPU time or CPU time usage rate used by the group of processes during the running. For example, when the CPU time is 20%, a value 20% may be saved in the control group file to limit the total CPU time used by the group of processes during the running, that is, 20%. For example again, the control group file related to the memory can limit the memory size occupied by the group of processes during the running.

Optionally, as another embodiment, the method shown in FIG. 1 further includes: before the container is used to perform control on the running of the group of processes, creating the container; generating the control group directory corresponding to the container; generating the at least one control group and flag file in the control group directory corresponding to the container; and establishing a one-to-one correspondence between the file name of the at least one control group file and the at least one flag bit in the flag file.

For example, when the container is created, the corresponding control group file and flag file may be generated in the control group directory of the container, and the control group file and the flag file may include an initial value. In addition, the one-to-one correspondence between the control group file and the flag bit may be established by using an array manner when the control group directory is created.

Optionally, as another embodiment, the method shown in FIG. 1 further includes: when the container is created, setting the at least one flag bit in the flag file to an initialization value; where when modifying the first flag bit corresponding to the first control group file in the flag file, setting the initialization value of the first flag bit corresponding to the first control group file.

If the flag bit is initialized as 0 when the container is created, whether the control group file corresponding to the flag bit is modified may be determined according to whether the value of the flag bit is 1.

It should be understood that, after the container state is restored, a next backup/restoration process is similar to the foregoing process.

According to the embodiment of the present invention, a modification condition of the control group file may be presented by means of establishing the flag bit used to indicate whether the container state is modified, thereby avoiding unnecessary traversing of the control group directory. In addition, the hash look-up table may be established for the control group file path to increase the file search and access efficiency, and the efficiency does not decrease with the expansion of the number of files in the control group directory. Compared with a conventional solution, the embodiment of the present invention increases the efficiency in the container state backup/restoration process and meanwhile enhances the expandability of the backup/restoration method.

FIG. 2 is a screen capture of a control group file system according to an embodiment of the present invention.

The control group file system according to the embodiment of the present invention may include a plurality of subsystems. For example, a blkio subsystem is used to limit the input and output control of a device (for example, a disk, a compact disk, and a USB) and may include control group files such as blkio.sectors, blkio.time, and blkio.weight. A cpu subsystem is used to provide an access to the CPU for a control group task (task) by using a scheduling program. A cpuacct subsystem is used to generate a cpu resource report for the control group task and may include files such as cpuacct.stat, cpuacct.usage, and cpuacct.usage_percpu. A cpuset subsystem is used to allocate independent cpu and memory for the control group task and may include files such as cpuset.cpus and cpuset.mems. A device is used to permit or deny the access of the control group task to the device and may include files such as devices.allow and devices.list. A freezer is used to suspend and restore the control group task and may include a freezer.state file. A memory is used to set a memory limit for each control group and generate a memory resource report and may include files such as memory.failcnt and memory.force_empty. A cgroup subsystem may include files such as event_control and cgroup.procs. A net_cls marks each network packet to facilitate the control group to use the network packet and may include files such as net_cls.classid.

According to the embodiment of the present invention, a file with a file name cont_flag may be added to the control group file system when the control group file system is created. The cont_flag file may include a flag bit corresponding to the control group file. For example, a binary sequence is saved in the cont_flag file and each binary bit record indicates whether the content of the corresponding control group file is modified. For example, if a binary bit is 1, it indicates that the control group file is modified; and if the binary bit is 0, it indicates that the control group file is not modified, or on the contrary.

Figure 3:
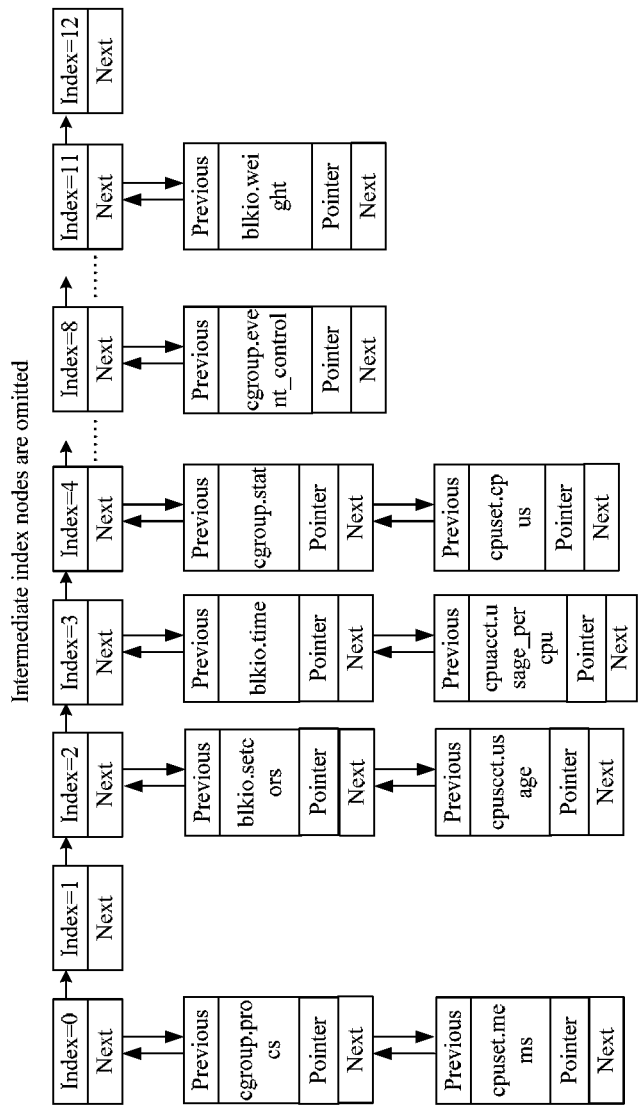
FIG. 3 is a schematic diagram of a hash look-up table according to an embodiment of the present invention.
Figure 4:
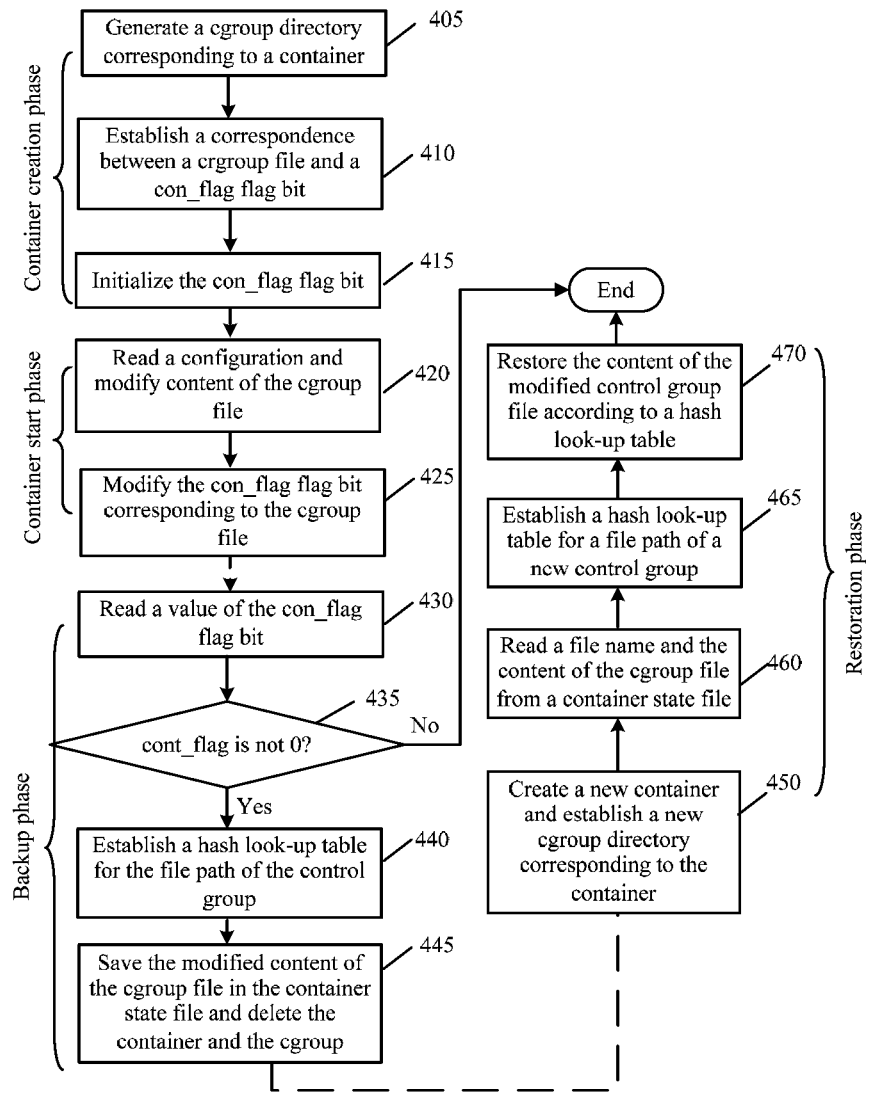
FIG. 4 is a schematic diagram of a container-based processing process according to an embodiment of the present invention.

FIG. 3 is a schematic diagram of a hash look-up table according to an embodiment of the present invention. FIG. 4 is a schematic diagram of a container-based processing process according to an embodiment of the present invention. The method shown in FIG. 4 is an example of the method shown in FIG. 1.

A container-based processing process may experience phases such as container creation, container running, container state backup, and container state restoration. In this embodiment, it is assumed that an application program is created in container 1 (container_1), and container_1 is set to be bound to a CPU (cpu0) numbered 0 for running when the container is created. The embodiment of the present invention is not limited thereto. For example, more containers may also be created and may limit other system resources used by a process. According to the embodiment of the present invention, a write function of the control group file system may be modified to set a flag bit, in a flag file cont_flag, corresponding to the control group file when the control group file is modified (or written). The flag bit is used to indicate whether content of the corresponding control group file is modified.

405: Create the container and generate a control group directory corresponding to the container.

Specifically, when the container_1 is created, a control group directory /cgroup/container_1 of the container is generated in a /cgroup directory, and the container_1 directory may also store the plurality of control group files shown in FIG. 2, where these control group files include a default value. When the control group directory /cgroup/container_1 is created, different from a conventional method, according to the embodiment of the present invention, the flag file cont_flag, which is used to indicate whether the content of the corresponding control group file in the container_1 is modified, may be stored in the control group directory /cgroup/container_1. For example, if a flag bit is 1, it indicates that the control group file corresponding to the flag bit is modified.

410: Establish a correspondence between the control group file and the cont_flag flag bit.

For example, during a process for creating the container, the correspondence between the flag bit in the flag file cont_flag and the file name of the control group file may be created at the same time. For example, during a process for creating the control group file, the correspondence between the flag bit and the control group file is established by using an array form.

415. Initialize the cont_flag flag bit.

For example, the cont_flag flag bit in the cont_flag flag file may be initialized so that all values of the cont_flag flag bits are 0. When the cont_flag flag bit is 0, it indicates that the control group file corresponding to the flag bit is not modified.

420. Read the configuration file and modify the content of the control group file according to the configuration file.

For example, the configuration file may be read when the container starts. The configuration file, for example, may include a preset limit value for a system resource, for example, include the file name of each control group file and the limit value for the corresponding system resource; and the limit value of these system resources may be written into the corresponding control group file by using the write function. Particularly, a value in the cpuset.cpus file may be set to 0 to configure that the container_1 is bound to the cpu0 for running. For example, the cpuset.cpus file in the container_1 directory may be opened first, a value 0 is written into the cpuset.cpus file, and the cpuset.cpus file is saved and closed at last.

425. When the content of the control group file is modified, modify the cont_flag flag bit corresponding to the control group file.

When a control group file is modified, the flag bit corresponding to the control group file is reset and is saved in the flag file cont_flag. For example, after the write function writes the value 0 into the cpuset.cpus file, the cont_flag flag bit, in the cont_flag file, corresponding to the cpuset.cpus file, is automatically set. For example, if a value 1 is written into a position where the flag bit is located, it indicates that the cpuset.cpus file corresponding to the flag bit is modified.

430. Read the value of the cont_flag flag bit from the flag file cont_flag in the control group directory.

In the phase of backing up the container state, in order to learn whether the content of the control group file is modified or the content of which control group file is modified, the flag file cont_flag in the control group directory /cgroup/container_1 may be opened first and the value of the cont_flag flag bit is read from the flag file cont_flag.

435. Determine whether the value of the cont_flag flag bit is 0. If the value of the flag bit is 0, it indicates that the control group file is not modified. Skip the phase of backing up the container state; otherwise, perform step 440.

For example, if all read values of the cont_flag flag bit are 0, it indicates that the cont_flag flag bit is not changed, which indicates that all control group files are not modified. Therefore, it is unnecessary to back up the container state. If the control group file does not have any modification, the process for backing up the control group file may be directly skipped, thereby reducing an unnecessary system overhead.

440. Create the hash look-up table for the file path of the control group.

If not all the cont_flag flag bit are 0, it indicates that a control group file is modified, and the hash look-up table for the paths of all the control group files (as shown in FIG. 3) in the container_1 is created, so as to rapidly search for a control group file. For example, it is determined that the file name of the modified file is cpuset.cpus according to the flag bit that is modified to 1, and then the cpuset.cpus file corresponding to the flag bit is searched for in the control group directory according to the file name.

In order to rapidly search for the modified control group file, according to the embodiment of the present invention, the hash look-up table may be established for the paths of all control group files, and a chain address method may be used to avoid a conflict caused by values of same keywords.

According to the embodiment of the present invention, it is assumed that the control group file system totally includes 10 to-be-indexed files, for example, blkio.sectors, blkio.time, blkio.weight, cgroup.event_control, cgroup.procs, cpuacct.stat, cpuacct.usage, cpuacct.usage_percpu, cpuset.cpus, and cpuset.mems.

When the hash look-up table is established, the keywords (key) of these file names may be determined first. For example, in the hash function, a summation value of ASCII codes of last three letters of the file name of the control group is used as the keyword of each control group file and a remainder obtained by dividing these keywords by 13 is used as an index value (index value). Therefore, the index value of this hash look-up table ranges from 0 to 12, that is, totally 13 values. Calculation results of the index values corresponding to the control group files are as follows:

111+114+115=340%13=2
105+109+1=1=315%13=3
103+104+116=323%13=11
114+111+108=333%13=8
111+99+115=325%13=0
116+97+116=329%13=4
97+103+101=328%13=2
99+112+117=328%13=3
112+117+115=355%13=4
101+109+115=325%13=0

A position arrangement of the 10 control group files in the hash look-up table is shown in FIG. 3.

445. Search for the modified control group file by using the hash look-up table, and save the modified content of the control group file.

For example, when a control group file is searched for, the index value of the control group file may be calculated according to the hash function, and then a corresponding index column is found in the hash look-up table shown in FIG. 3 according to the index value, and therefore the corresponding storage location is found. For example, the index value of the control group file cpuset.cpus is 4 and is located in the index column with index=4. Then, the file name of the control group file and the file name of each node on a linked list in the column are compared. If comparison results are the same, it indicates that the file is found. Besides the file name of the control group file, each node further stores a pointer (file*) uniquely corresponding to the control group file, which is used to determine an actual storage location of the control group file.

For example, in this embodiment, the cpuset.cpus file may be found in the hash look-up table and current content in the cpuset.cpus file is saved in the container state file. For example, a list form may be adopted to save the file name of the control group file in one field and save the content corresponding to the file name of the control group file in another field. The container state file may be stored in the file directory where a process running in the container is located. The embodiment of the present invention is not limited thereto, and the container state file may also be stored in another file directory.

In addition, after the phase of backing up the container state, the container and the control group directory corresponding to the container may be deleted.

450. In a phase of restoring the container state, establish a new control group directory corresponding to a new container.

For example, in order to restore the container state, the new container may be created, and the new control group directory is established for the new container when the new container is created. The new control group directory includes a new control group file (that is, a to-be-restored control group file) and a new flag file (that is, a to-be-restored flag file). For example, the new control group directory includes a new cpuset.cpus file and content included in the new cpuset.cpus file is a default value.

Optionally, whether restoration needs to be implemented may be determined according to whether backup is available.

Optionally, as another embodiment, whether the restoration is needed may be determined by judging whether the value of the cont_flag flag bit is 0.

It should be understood that, a backup/restoration process of a new container state is the same as the backup/restoration process of the container, which is not further described herein.

460. Read a file name and content of a modified control group file from the container state file.

For example, the container state file may be opened and the saved file name and content of the control group file are read. For example, in the container state file, a file name "cpuset.cpus file" of the cpuset.cpus file and value 0 in the cpuset.cpus file are read.

465. Create the hash look-up table for the file path of the new control group.

A process for establishing the hash look-up table in the phase of restoring the container state is similar to the process for establishing the hash look-up table in the phase of backing up the container state, which is not further described herein.

470. Restore the modified content of the control group file according to the hash look-up table.

For example, after the hash look-up table is established, the new cpuset.cpus file may be searched for in the new control group directory by using the hash look-up table according to the file name cpuset.cpus of the cpuset.cpus file, the new cpuset.cpus file is opened, and the read content (that is, the limit value 0 in the configuration file in 420) of the cpuset.cpus is written into the new cpuset.cpus file. Therefore, the container is restored to a state before the backup, that is, the new container state is the same as the original container state before the backup.

In addition, the user can manually clear the flag bit, or the system automatically clears the flag bit after the restoration of the container state is completed.

To sum up, in one aspect, the embodiment of the present invention optimizes the traversing mechanism in an existing solution and avoids unnecessary traversing of the control group directory by using a manner of establishing the flag bit to identify a modification condition of the control group file.

In addition, in the container state backup/restoration phase, the hash look-up table index may be established for the control group file path to increase the file search and access efficiency, and the efficiency does not decrease with the expansion of the number of files in the control group directory.

Compared with an existing solution, the present invention increases the efficiency in the container state backup/restoration process, and meanwhile enhances the expandability of the backup/restoration method.

Figure 5:
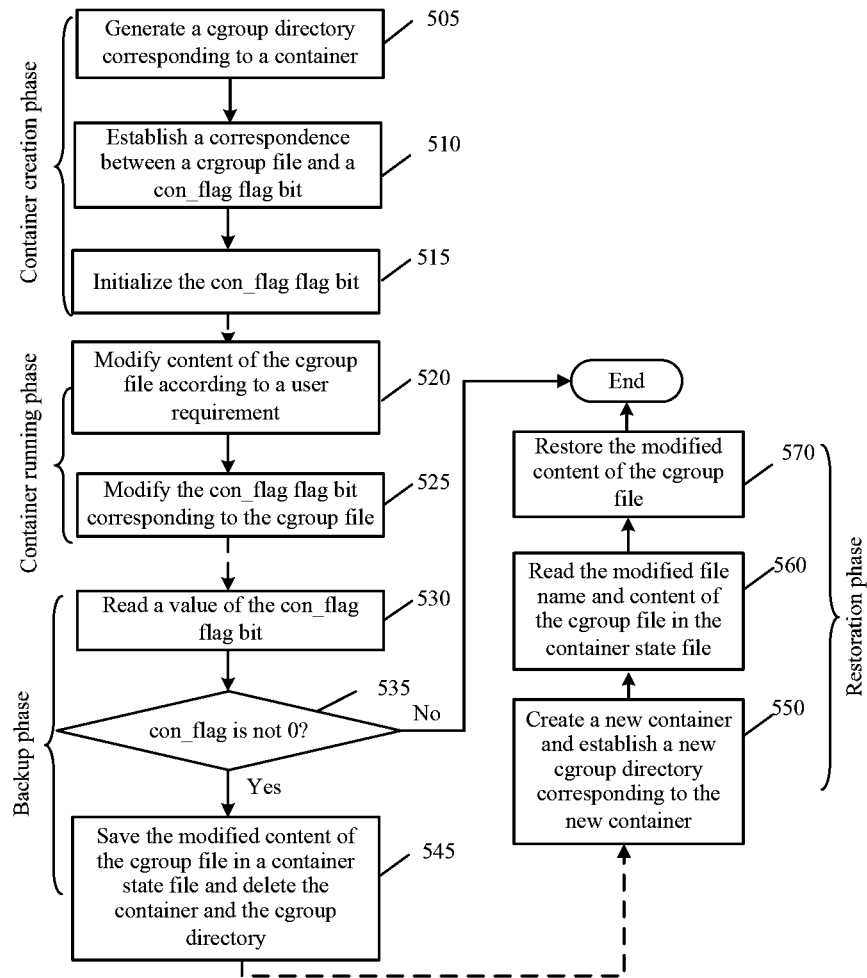
FIG. 5 is a schematic diagram of a container-based processing process according to another embodiment of the present invention.

FIG. 5 is a schematic diagram of a container-based processing process according to another embodiment of the present invention. The method shown in FIG. 5 is another example of the method shown in FIG. 1. Different from FIG.

4, during the container creation process, the system resource occupied by the process is not limited, but the user limits the system resource occupied by the process during the container running process. 505 to 515, 525 to 535, and 550 to 560 in FIG. 5 are similar to 405 to 415, 425 to 435, and 450 to 460 in FIG. 4, which are not further described herein.

505: Create the container and generate a control group directory corresponding to the container.

510: Establish a correspondence between a control group file and a cont_flag flag bit.

515. Initialize the cont_flag flag bit.

520. Modify the content of the control group file according to a user requirement.

For example, during the container running process, the user manually modifies the control group file. When the user expects that the container is bound to the cpu0 to run, the user can manually write value 0 in the cpuse.cpus file in the control group directory, thereby binding the container to the cpu0 to run.

525. When the content of the control group file is modified, modify the cont_flag flag bit corresponding to the control group file.

530. Read the value of the cont_flag flag bit from the flag file cont_flag in the control group directory.

535. Determine whether the value of the cont_flag flag bit is 0. If the value of the flag bit is 0, it indicates that the control group file is not modified. Skip the phase of backing up the container state; otherwise, perform step 440.

545. Search for the modified control group file, and save the modified content of the control group file.

For example, if not all the cont_flag flag bit are 0, it indicates that a control group file is modified, and a conventional search method (for example, traversing or dichotomy method) may be used first to search for the cpuse.cpus file in the control group directory, and the current content in the cpuset.cpus file is saved in the container state file, where the container state file may be stored in the file directory where the process running in the container is located. Certainly, the embodiment of the present invention may also use the hash look-up table method shown in FIG. 4 to search for the control group file.

In addition, after the container state is backed up, the container and the control group directory corresponding to the container may be deleted.

550. In the phase of restoring the container state, establish a new control group directory corresponding to the new container.

560. Read the file name and the content of the modified control group file in the container state file.

570. Restore the modified content of the control group file.

For example, a conventional search method (for example, traversing or dichotomy method) may be used first to search for the new cpuse.cpus file in the new control group directory; for example, the new cupset.cpus file in the new control group directory may be searched for according to the file name cpuset.cpus of the cpuset.cpus file, the new cpuset.cpus file is opened, and the read content (that is, value 0 written by the user in 520) of the cpuset.cpus file is written into the new cupset.cpus file, thereby restoring the container to the state before backup, that is, the new container state is the same as the original container state before the backup. Certainly, the embodiment of the present invention may also use the hash look-up table method shown in FIG. 4 to search for the control group file.

Figure 6:
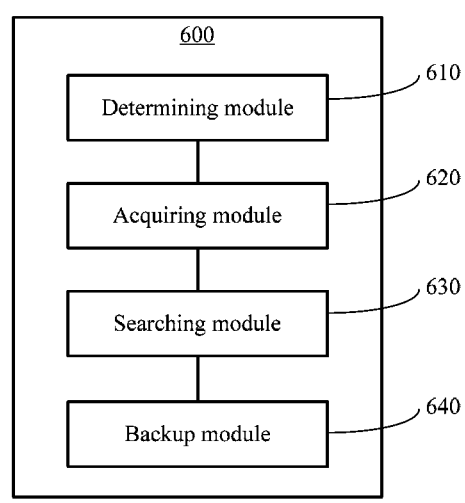
FIG. 6 is a schematic structural diagram of a container-based processing system according to an embodiment of the present invention.

FIG. 6 is a schematic structural diagram of a container-based processing apparatus 600 according to an embodiment of the present invention. The processing apparatus shown in FIG. 6 includes a determining module 610, an acquiring module 620, a searching module 630, and a backup module 640.

The determining unit 610 is configured to: when a container state needs to be backed up, determine, according to a first flag bit in a flag file, that content of a first control group file in at least one control group file of the container is modified, where the at least one control group file is used to perform control on running of a group of processes in the container, the flag file includes at least one flag bit corresponding to the at least one control group file, and the at least one flag bit is used to separately indicate whether content of the at least one control group file is modified.

The acquiring module 620 is configured to: acquire, according to a correspondence between the at least one flag bit and a file name of the at least one control group file, a file name of the first control group file corresponding to the first flag bit.

The searching module 630 is configured to search for, according to a correspondence between the file name of the at least one control group file and a storage location of the at least one control group file, a storage location of the first control group file corresponding to the file name of the first control group file, and extract modified content of the first control group file from the first control group file stored in the storage location of the first control group file.

The backup module 640 is configured to back up the file name of the first control group file and the modified content of the first control group file.

As seen above, according to the container-based processing apparatus in the embodiment of the present invention, the control group file, of which the content is modified may be determined by using the flag bit in the flag file, and therefore the container state may be learnt without traversing all the control group files, and the storage location of the modified control group file may be searched for only according to the flag bit and the modified content of the control group file may be backed up, thereby reducing the system overhead.

Figure 7:
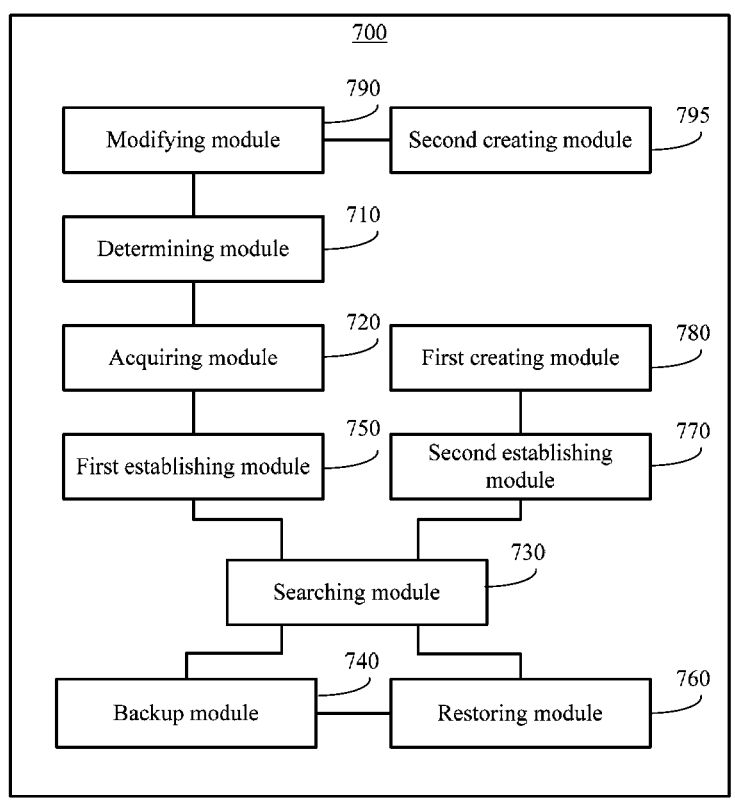
FIG. 7 is a schematic structural diagram of a container-based processing system according to another embodiment of the present invention.

FIG. 7 is a schematic structural diagram of a container-based processing system according to another embodiment of the present invention. The processing apparatus shown in FIG. 7 includes a determining module 710, an acquiring module 720, a searching module 730, and a backup module 740. The determining module 710, an acquiring module 720, a searching module 730, and a backup module 740 shown in FIG. 7 are similar to the determining module 610, the acquiring module 620, the searching module 630, and the backup module 640 shown in FIG. 6, which are not further described herein.

Optionally, as another embodiment, the processing apparatus 700 further includes a first establishing module 750. The first establishing module 750 is configured to establish a first hash look-up table for a file path of the at least one control group file, where the first hash look-up table is used to indicate the correspondence between the file name of the at least one control group file and the storage location of the at least one control group file.

Accordingly, the searching module 730 is specifically configured to search for, in the first hash look-up table according to the file name of the first control group file, the storage location of the first control group file corresponding to the file name of the first control group file and extract the modified content of the first control group file from the first control group file stored in the storage location of the first control group file.

Accordingly, the backup module 740 is specifically configured to back up, in a container state file, the file name of the first control group file and the modified content of the first control group file.

Optionally, as another embodiment, the acquiring module 720 is further configured to: when the container state needs to be restored, acquire the backed up file name of the first control group file and the modified content of the first control group file; it should be understood that, in an implementation manner, the acquiring module 720 acquires, in the container state file, the backed up file name of the first control group file and the modified content of the first control group file.

Accordingly, the searching module 730 is further configured to search for, according to the correspondence between a file name of at least one to-be-restored control group file and a storage location of the at least one to-be-restored control group file, a storage location of a to-be-restored first control group file corresponding to the file name of the first control group file.

Accordingly, the processing apparatus 700 further includes a restoring module 760. The restoring module 760 is configured to write the backed up modified content of the first control group file into the to-be-restored first control group file stored in the storage location of the to-be-restored first control group file.

Optionally, as another embodiment, a second establishing module 770 is configured to establish a second hash look-up table for a file path of the at least one to-be-restored control group file, where the second hash look-up table is used to indicate the correspondence between the file name of the at least one to-be-restored control group file and the storage location of the at least one to-be-restored control group file.

Accordingly, the searching module 730 is specifically configured to search, in the second hash look-up table according to the file name of the first control group file, the storage location of the to-be-restored first control group file corresponding to the file name of the first control group file.

Optionally, as another embodiment, the processing apparatus 700 further includes a first creating module 780, configured to: when the container state needs to be restored, create a new container; generate a control group directory corresponding to the new container, generate the at least one to-be-restored control group file and a to-be-restored flag file in the control group directory corresponding to the new container; and establish a one-to-one correspondence between the file name of the at least one to-be-restored control group file and the to-be-restored flag file.

Optionally, as another embodiment, the processing apparatus 700 further includes a modifying module 790, configured to: when the content of the first control group file in the at least one control group file is modified, modify the first flag bit that is in the flag file and corresponding to the first control group file.

Accordingly, determining module 710 is specifically configured to: when at least one flag bit in the flag file is modified, determine that the container state needs to be backed up, or detect whether at least one flag bit in the flag file is modified when an instruction for backing up the container state is received or a preset period for backing up the container state expires, determine, if it is detected that at least one flag bit in the flag file is modified, that the container state needs to be backed up, and determine, according to the first flag bit in the flag file, that the content of the first control group file in at least one control group file of the container is modified, where the at least one control group file is used to perform control on the running of a group of processes in the container, the flag file includes at least one flag bit corresponding to the at least one control group file, and the at least one flag bit is used to separately indicate whether the content of the at least one control group file is modified.

According to the embodiment of the present invention, the modifying module 790 is specifically configured to: when the container starts, modify the content of the first control group file in the at least one control group file according to a preset configuration file.

Optionally, as another embodiment, the modifying module 790 is specifically configured to modify, during a running process of the container, the content of the first control group file in the at least one control group file according to a user requirement.

Optionally, as another embodiment, the modifying module 790 is further configured to: when the container is created, set at least one flag bit in the flag file to an initialization value, where the modifying module 790 is specifically configured to set the initialization value of the first flag bit that is in the flag bit file and corresponding to the first flag bit when the content of the first control group file in the at least one control group file is modified.

According to the embodiment of the present invention, the content of the at least one control group file includes a limit value for a resource used by a group of processes in the container during running.

Optionally, as another embodiment, the processing apparatus 700 further includes a second creating module 795. The second creating module 795 is configured to: before the container is used to perform control on the running of the group of processes, create the container, generate the control group directory corresponding to the container, generate at least one control group file and the flag file in the control group directory corresponding to the container, and establish a one-to-one correspondence between the file name of the at least one control group file and the at least one flag bit in the flag file.

Figure 8:
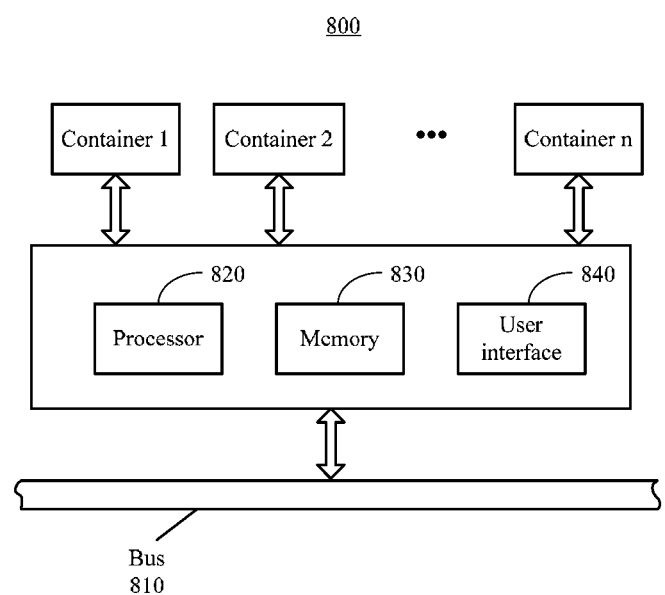
FIG. 8 is a schematic block diagram of a computer system according to an embodiment of the present invention.

FIG. 8 is a schematic block diagram of a computer system 800 according to an embodiment of the present invention. As shown in FIG. 8, the computer system includes a bus 810; a processor 820 (one or more processors may be employed, and FIG. 8 uses one processor as an example) connected to the bus 810, where one or more containers (for example, container 1, container 2, . . . , container n) are running on the processor 820; and a memory 830 connected to the bus 810; where the processor 820 calls code stored in the memory 830 over the bus 810 to: when a state of a container among the one or more containers need to be backed up, determine, according to a first flag bit in a flag file, that content of a first control group file in at least one control group file of the container is modified, where the at least one group of control group file are used to perform control on running of a group of processes in the container, the flag file includes at least one flag bit corresponding to the at least one control group file, and the at least one flag bit is used to separately indicate whether content of the at least one control group file is modified; acquire, according to a correspondence between the at least one flag bit and a file name of the at least one control group file, a file name of the first control group file corresponding to the first flag bit; search for, according to a correspondence between the file name of the at least one control group file and a storage location of the at least one control group file, a storage location of the first control group file corresponding to the file name of the first control group file, and extract modified content of the first control group file from the first control group file stored in the storage location of the first control group file; and back up the file name of the first control group file and the modified content of the first control group file. In addition, the computer system may further include a user interface 840, which is configured to provide, for a user, during a running process of the container, an interface for modifying the content of the first control group file in the at least one control group file, for example, an input/output (I/O) interface.

According to the computer system in the embodiment of the present invention, the control group file of which the content is modified may be determined by using the flag bit in the flag file. Therefore, the container state may be learnt without traversing all the control group files, and the storage location of the modified control group file may be searched for only according to the flag bit and the modified content of the control group file may be backed up, thereby reducing the system overhead.

Optionally, as another embodiment, the processor 820 is further configured to: when the container state needs to be restored, acquire the backed up file name of the first control group file and the modified content of the first control group file; the processor 820 is specifically configured to search for, according to the correspondence between a file name of at least one to-be-restored control group file and a storage location of the at least one to-be-restored control group file, a storage location of a to-be-restored first control group file corresponding to the file name of the first control group file, and the processor 820 is further configured to write the backed up modified content of the first control group file into the to-be-restored first control group file.

Optionally, as another embodiment, the processor 820 is further configured to: when the content of the first control group file in the at least one control group file is modified, modify the first flag bit that is in the flag file and corresponding to the first control group file.

According to the embodiment of the present invention, a modification condition may be presented by means of establishing the flag bit for the container state, thereby avoiding unnecessary traversing of the control group directory. In addition, the hash look-up table may be established for the control group file path to increase the file search and access efficiency, and the efficiency does not decrease with the expansion of the number of files in the control group directory. Compared with an existing solution, the embodiment of the present invention increases the efficiency in the container state backup/restoration process and meanwhile enhances the expandability of the backup/restoration method.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A container-based processing method, wherein, the container is in a Linux operating system and is a type of virtualization of a resource on an operating system layer and is used to isolate processes and resources, the container-based processing method is performed by a computer system, comprising:
when a container state needs to be backed up, determining, according to a first flag bit in a flag file, that content of a first control group file in at least one control group file of a container is modified, wherein the at least one control group file, which is in the Linux operating system kernel, is used to perform control on running of a group of processes in the container, the flag file comprises at least one flag bit corresponding to the at least one control group file, and the at least one flag bit separately indicates whether content of the at least one control group file is modified;
acquiring, according to a correspondence between the at least one flag bit and a file name of the at least one control group file, a file name of the first control group file corresponding to the first flag bit;
searching for, according to a correspondence between the file name of the at least one control group file and a storage location of the at least one control group file, a storage location of the first control group file corresponding to the file name of the first control group file, and extracting modified content of the first control group file from the first control group file stored in the storage location of the first control group file; and
backing up the file name of the first control group file and the modified content of the first control group file.

2. The container-based processing method according to claim 1, further comprising:
establishing a first hash look-up table for a file path of the at least one control group file, wherein the first hash look-up table indicates the correspondence between the file name of the at least one control group file and the storage location of the at least one control group file,
wherein searching for, the storage location of the first control group file comprises:
searching for, in the first hash look-up table according to the file name of the first control group file, the storage location of the first control group file corresponding to the file name of the first control group file.

3. The container-based processing method according to claim 1, further comprising:
when the container state needs to be restored, acquiring the backed up file name of the first control group file and the modified content of the first control group file;
searching for, according to the correspondence between a file name of at least one to-be-restored control group file and a storage location of the at least one to-be-restored control group file, a storage location of a to-be-restored first control group file corresponding to the file name of the first control group file; and
writing the backed up modified content of the first control group file into the to-be-restored first control group file stored in the storage location of the to-be-restored first control group file.

4. The container-based processing method according to claim 3, further comprising:
establishing a second hash look-up table for a file path of the at least one to-be-restored control group file, wherein the second hash look-up table indicates the correspondence between the file name of the at least one to-be-restored control group file and the storage location of the at least one to-be-restored control group file,
wherein searching for, the storage location of the to-be-restored first control group file corresponding to the file name of the first control group file comprises:
searching for, in the second hash look-up table according to the file name of the first control group file, the storage location of the to-be-restored first control group file corresponding to the file name of the first control group file.

5. The container-based processing method according to claim 3, further comprising:
when the container state needs to be restored, creating a new container;
generating a control group directory corresponding to the new container;
generating the at least one to-be-restored control group file and a to-be-restored flag file in the control group directory corresponding to the new container; and
establishing a one-to-one correspondence between the file name of the at least one to-be-restored control group file and the to-be-restored flag file.

6. The container-based processing method according to claim 1, further comprising:
when the content of the first control group file in the at least one control group file is modified, modifying the first flag bit that is in the flag file and that corresponds to the first control group file; and
when at least one flag bit in the flag file is modified, determining that the container state needs to be backed up.

7. The container-based processing method according to claim 6, wherein that the content of the first control group file in the at least one control group file is modified comprises:
when the container starts, modifying the content of the first control group file in the at least one control group file according to a preset configuration file.

8. The container-based processing method according to claim 6, further comprising:
when the container is created, setting at least one flag bit in the flag file to an initialization value;
wherein modifying the first flag bit comprises:
setting the initialization value of the first flag bit corresponding to the first control group file.

9. The container-based processing method according to claim 6, wherein that the content of the first control group file in the at least one control group file is modified comprises:
during a running process of the container, modifying the content of the first control group file in the at least one control group file according to a user requirement.

10. The container-based processing method according to claim 1, wherein the content of the at least one control group file comprises a limit value of a resource used when the group of processes in the container are running.

11. The container-based processing method according to claim 1, further comprising:
before running of the group of processes is controlled by using the container, creating the container;
generating a control group directory corresponding to the container;
generating the at least one control group file and the flag file in the control group directory corresponding to the container; and
establishing a one-to-one correspondence between the file name of the at least one control group file and the at least one flag bit in the flag file.

12. The container-based processing method according to claim 1, further comprising:
when the content of the first control group file in the at least one control group file is modified, modifying the first flag bit that is in the flag file and corresponding to the first control group file; and
when an instruction for backing up the container state is received or a preset period for backing up the container state expires, detecting whether at least one flag bit in the flag file is modified, and determining that the container state needs to be backed up when it is detected that at least one flag bit in the flag file is modified.

13. A computer system, comprising:
a bus;

a processor connected to the bus, wherein one or more containers are running on the processor; and
a non-transitory memory connected to the bus;
wherein when executed, code stored in the memory causes the processor over the bus to:
when a state of a container of one or more containers need to be backed up, determine, according to a first flag bit in a flag file, that content of a first control group file in at least one control group file of the container is modified, wherein the container is in a Linux operating system and is a type of virtualization of a resource on an operating system layer and is used to isolate processes and resources, the at least one control group file, which is in the Linux operating system kernel, is used to perform control on running of a group of processes in the container, the flag file comprises at least one flag bit corresponding to the at least one control group file, and the at least one flag bit separately indicates whether content of the at least one control group file is modified;
acquire, according to a correspondence between the at least one flag bit and a file name of the at least one control group file, a file name of the first control group file corresponding to the first flag bit;
search for, according to a correspondence between the file name of the at least one control group file and a storage location of the at least one control group file, a storage location of the first control group file corresponding to the file name of the first control group file, and extract modified content of the first control group file from the first control group file stored in the storage location of the first control group file; and
back up the file name of the first control group file and the modified content of the first control group file.

14. The computer system according to claim 13, wherein the processor is further configured to: when the container state needs to be restored, acquire the backed up file name of the first control group file and the modified content of the first control group file, search for, according to the correspondence between a file name of at least one to-be-restored control group file and a storage location of the at least one to-be-restored control group file, a storage location of a to-be-restored first control group file corresponding to the file name of the first control group file, and write the backed up modified content of the first control group file into the to-be-restored first control group file.

15. The computer system according to claim 14, wherein the processor is further configured to: establish a second hash look-up table for a file path of the at least one to-be-restored control group file, wherein the second hash look-up table indicates the correspondence between the file name of the at least one to-be-restored control group file and the storage location of the at least one to-be-restored control group file,
wherein in searching for, the storage location of the to-be-restored first control group file corresponding to the file name of the first control group file, the processor is further configured to: search for, in the second hash look-up table according to the file name of the first control group file, the storage location of the to-be-restored first control group file corresponding to the file name of the first control group file.

16. The computer system according to claim 14, wherein the processor is further configured to: create a new container when the container state needs to be restored; generate a control group directory corresponding to the new container; generate the at least one to-be-restored control group file and a to-be-restored flag file in the control group directory corresponding to the new container; and establish a one-to-one correspondence between the file name of the at least one to-be-restored control group file and the to-be-restored flag file.

17. The computer system according to claim 13, wherein the processor is further configured to: when the content of the first control group file in the at least one control group file is modified, modify the first flag bit that is in the flag file and that corresponds to the first control group file, and when at least one flag bit in the flag file is modified, determine that the container state needs to be backed up.

18. The computer system according to claim 13, wherein the processor is further configured to:
establish a first hash look-up table for a file path of the at least one control group file, wherein the first hash look-up table indicates the correspondence between the file name of the at least one control group file and the storage location of the at least one control group file, and wherein in the searching for, the storage location of the first control group file, the processor is further configured to: search for, in the first hash look-up table according to the file name of the first control group file, the storage location of the first control group file corresponding to the file name of the first control group file.

19. The computer system according to claim 13, wherein the processor is further configured to: before running of the group of processes is controlled by using the container, create the container; generate a control group directory corresponding to the container; generate the at least one control group file and the flag file in the control group directory corresponding to the container; and establish a one-to-one correspondence between the file name of the at least one control group file and the at least one flag bit in the flag file.

20. The computer system according to claim 13, wherein the processor is further configured to:
when the content of the first control group file in the at least one control group file is modified, modify the first flag bit that is in the flag file and corresponding to the first control group file;
when at least one flag bit in the flag file is modified, determine that the container state needs to be backed up, or detect whether at least one flag bit in the flag file is modified when an instruction for backing up the container state is received or a preset period for backing up the container state expires, determine, if it is detected that at least one flag bit in the flag file is modified, that the container state needs to be backed up, and determine, according to the first flag bit in the flag file, that the content of the first control group file in the at least one control group file of the container is modified.

21. The computer system according to claim 20, wherein the processor is further configured to: during a running process of the container, modify the content of the first control group file in the at least one control group file according to a user requirement.

22. The computer system according to claim 13, wherein the processor is further configured to:
when the container starts, modify the content of the first control group file in the at least one control group file according to a preset configuration file.

23. The computer system according to claim 13, wherein the processor is further configured to:
when the container is created, set at least one flag bit in the flag file to an initialization value; and when the content of the first control group file in the at least one control group file is modified, set the initialization value of the first flag bit that is in the flag file and corresponding to the first control group file.

* * * * *